(12) United States Patent
Polegato Moretti (10) Patent No.: US 9,538,808 B2
(45) Date of Patent: Jan. 10, 2017

(54) METHOD FOR MANUFACTURING A WATERPROOF AND VAPOR-PERMEABLE SHOE

(75) Inventor: Mario Polegato Moretti, Crocetta del Montello (IT)

(73) Assignee: GEOX S.p.A., Montebelluna (IT)

( * ) Notice: Subject to any disclaimer, the term of this patent is extended or adjusted under 35 U.S.C. 154(b) by 39 days.

(21) Appl. No.: 13/263,344

(22) PCT Filed: Mar. 12, 2010

(86) PCT No.: PCT/EP2010/053225
§ 371 (c)(1),
(2), (4) Date: Oct. 7, 2011

(87) PCT Pub. No.: WO2010/115679
PCT Pub. Date: Oct. 14, 2010

(65) Prior Publication Data
US 2012/0030885 A1 Feb. 9, 2012

(30) Foreign Application Priority Data

Apr. 10, 2009 (EP) .................................... 09425138

(51) Int. Cl.
*A43B 13/00* (2006.01)
*A43B 7/06* (2006.01)
(Continued)

(52) U.S. Cl.
CPC .............. *A43B 7/125* (2013.01); *A43B 7/08* (2013.01); *A43B 7/087* (2013.01); *A43B 9/12* (2013.01); *A43D 8/34* (2013.01); *B29D 35/061* (2013.01)

(58) Field of Classification Search
CPC ........... A43B 7/08; A43B 7/125; A43B 7/087; A43D 8/34; B29D 35/061
(Continued)

(56) References Cited

U.S. PATENT DOCUMENTS 5,285,546 A * 2/1994 Haimerl ...................... 12/142 E
5,426,869 A * 6/1995 Gore et al. ..................... 36/22 R
(Continued)

FOREIGN PATENT DOCUMENTS

DE 44 33 870 3/1996
EP 0 464 800 1/1992
(Continued)

OTHER PUBLICATIONS

International Search Report Issued Jun. 7, 2010 in PCT/EP10/053225 filed Mar. 12, 2010.
(Continued)

*Primary Examiner* — Jila M Mohandesi
*Assistant Examiner* — Katharine Gracz
(74) *Attorney, Agent, or Firm* — Oblon, McClelland, Maier & Neustadt, L.L.P.

(57) ABSTRACT

A method for providing a waterproof and vapor-permeable shoe, including: constructing an upper shoe assembly, including at least one vapor-permeable lining, a vapor-permeable upper, and a waterproof and vapor-permeable upper membrane that is between them; fixing to a vapor-permeable assembly insole a first gasket made of waterproof material, which has at least one vapor-permeable or perforated portion; lasting, to obtain an upper assembly of the shoe; sealing the lasting margins to the first gasket by a second gasket, including adhesion of the second gasket; and assembling, including connection of a sole to the upper assembly at least by the adhesion of material that composes the sole to the second gasket.

28 Claims, 8 Drawing Sheets (51) Int. Cl.
*A43B 7/12* (2006.01)
*A43B 7/08* (2006.01)
*A43B 9/12* (2006.01)
*A43D 8/34* (2006.01)
*B29D 35/06* (2010.01)

(58) Field of Classification Search
USPC .. 36/3 B, 3 R, 30 R, 25 R, 31, 14; 12/146 B, 12/142 R, 146 BR, 142 RS, 142 T
See application file for complete search history.

(56) References Cited

U.S. PATENT DOCUMENTS

| | | | | |
|---|---|---|---|---|
| 5,983,524 | A * | 11/1999 | Polegato | 36/3 R |
| 7,370,382 | B2 | 5/2008 | Moretti | |
| 8,281,502 | B2 * | 10/2012 | Haimerl | 36/14 |
| 8,566,991 | B2 * | 10/2013 | Mueller | 12/146 B |
| 2002/0040537 | A1 * | 4/2002 | Polegato Moretti | 36/14 |
| 2002/0053148 | A1 * | 5/2002 | Haimerl | 36/55 |
| 2005/0138845 | A1 | 6/2005 | Haimerl | |
| 2005/0241082 | A1 | 11/2005 | Moretti | |
| 2006/0162183 | A1 * | 7/2006 | Polegato Moretti | 36/3 B |
| 2007/0011907 | A1 * | 1/2007 | Polegato Moretti | A43B 3/128 36/3 B |
| 2010/0115792 | A1 | 5/2010 | Muller | |

FOREIGN PATENT DOCUMENTS

| | | |
|---|---|---|
| EP | 0 713 657 A1 | 5/1996 |
| WO | 03 070041 | 8/2003 |
| WO | 2008 119683 | 10/2008 |
| WO | WO 2008/116772 A1 | 10/2008 |

OTHER PUBLICATIONS

European Search Report Issued Oct. 19, 2009 in European Application No. 09425138.6 filed Apr. 10, 2009.
Combined Georgian Office Action and Search Report issued Jul. 27, 2012 in Patent Application No. AP 2010 012444 with English Translation.
U.S. Appl. No. 11/177,668, filed Jul. 11, 2005, 2005-0241082, Polegato Moretti.

* cited by examiner

METHOD FOR MANUFACTURING A WATERPROOF AND VAPOR-PERMEABLE SHOE

TECHNICAL FIELD

The present invention relates to a method for manufacturing a waterproof and vapor-permeable shoe, predominantly provided by means of the working method known as "AGO lasting".

BACKGROUND ART

It is known that the comfort of a shoe is linked not only to its anatomically fitting properties but also to the capacity to dissipate outward the water vapor that forms inside the shoe due to sweating.

For this reason, waterproof shoes with an upper coupled to a lining that is laminated with a waterproof and vapor-permeable membrane have now been known for years.

The expression "waterproof and vapor-permeable" generally references the characteristic of tightness to water in the liquid state combined with permeability to water vapor.

The portion of the foot that notoriously has the greatest perspiration effect is the sole, and the sweat that it generates saturates the air with moisture and mostly condenses, stagnating on the footbed.

Only a marginal fraction of the moisture produced by sweating is diffused to the sides of the upper and exits from them if they are vapor-permeable.

In order to allow easy dissipation of the sweat that tends to accumulate in the plantar region, shoes are currently known which have different types of rubber soles that are impermeable to water in the liquid state and are permeable to water vapor and are obtained by using a vapor-permeable and waterproof membrane, which is sealed to the body of the sole so as to cover through openings thereof.

The production method commonly known as "AGO lasting" has long been known in the shoe manufacturing field and provides, with an operation known as lasting, for pulling the upper shoe assembly onto the last, folding its lower edges, known as lasting margins, under an insole, to which they are glued perimetrically, so as to interpose themselves partially between said insole and the sole that will be assembled thereon.

Assembling the sole consists in joining the sole to the upper portion of the shoe, by gluing or by direct injection in a mold.

So-called "AGO lasting" construction is generally used for shoes of the type generally classified as classic or elegant.

Stretching the upper and the lining on the last in fact allows to make them adhere thereto precisely, achieving an effective formation.

The assembly insole is made of a flexible material that however is structured enough to not undergo deformation due to the traction applied thereto by the lasting margins glued onto it during lasting.

Currently it is known that even when the upper shoe assembly has a waterproof and vapor-permeable membrane, between the outer layer of the upper and the inner lining without additional refinements, then there is a substantially total lack of waterproofness.

The "AGO lasting" construction, in the way it is currently performed, in fact allows penetration of water toward the inside of the shoe through the outer layer of the upper and through the insole.

A need that is particularly felt in the manufacture of shoes with a waterproof and vapor-permeable membrane, in the upper shoe assembly, consists in achieving an effective seal of the joining regions between the assembly insole, the lining laminated with the upper membrane, the upper and the sole, in order to avoid even the slightest infiltration of water from outside.

It is in fact particularly difficult to seal the sole to said membrane, since in so-called "AGO lasting" construction the bottom of the shoe is not smooth and flat, as occurs for example in the case of "Strobel" construction, in which the edges of the insole are sewn to the edges of the upper or of the lining laminated with the membrane, but the lasting margins of the upper are superimposed on the assembly insole, creating irregularities along its perimeter.

In particular, the creases produced as a consequence of the assembly of the toe and heel of the upper onto the assembly insole constitute actual channels for water infiltration.

However, it is not possible to remove these protrusions by means of the common operation of roughing the upper with steel brushes, since this operation might damage the waterproof and vapor-permeable membrane between the upper and the lining.

Accordingly, as described for example in patent application WO9316612, shoes have now been studied for years which have a waterproof and vapor-permeable insole which comprises a waterproof and vapor-permeable membrane with which the lasting margins of a lining laminated with a waterproof and vapor-permeable membrane are associated by means of a first lasting operation.

The joining region between the lining with the membrane and the insole is sealed by means of a waterproof sealing tape.

The lasting margins of the outer layer of the upper are then associated, by means of a second lasting operation, with the waterproof and vapor-permeable insole.

This production method is not free from aspects that can be improved, since the water absorbed by the outer layer of the upper and wicked inside it can stagnate below the waterproof insole.

Moreover, this construction has an additional drawback if a sole provided with openings is used, since water might enter through said openings and wet the lasting margins of the upper, impregnating it and thus rising toward the foot insertion region.

Moreover, the use of a waterproof and vapor-permeable membrane that covers the entire surface of the insole, if the vapor-permeable surface of the sole does not extend over its entire longitudinal direction, is useless and very expensive.

An alternative to the use of a waterproof and vapor-permeable insole is described in U.S. Pat. No. 5,426,869, in which a waterproof layer acting as a gasket is provided by a non-woven polyester fabric that is uniformly coated on one of its faces with a layer of adhesive based on polycaprolactone.

This waterproof gasket is used to fill the area comprised transversely between the lasting margins of the lining or of the upper, if they are waterproof and vapor-permeable, and constitutes a waterproof layer between the insole and the sole.

Since the gasket is made of waterproof and non-vapor-permeable material, this construction is unsuitable with a rubber sole rendered impermeable to water in the liquid state and permeable to water vapor by means of regions that are open or perforated and are covered and sealed with a waterproof and vapor-permeable membrane.

Moreover, if the gasket were provided with holes at the vapor-permeable area of the sole, in order to allow the outflow of the water vapor generated by sweating, the lasting margins of the outer layer of the upper would wick, toward the inside of the shoe, the water, which would migrate onto the insole indeed through the holes in the gasket.

An alternative to these solutions is to use a lining with a waterproof and vapor-permeable membrane that is closed like a sock, so as to wrap around the foot completely.

In this case, the production method entails that an insole is applied to the bottom of the sock and the lasting margins of the outer layer of the upper are folded and glued onto said insole perimetrically.

The sock-like lining comprises an opening for the foot and is generally formed by two lateral portions and a lower portion, the connection of which is provided by means of zigzag and/or Strobel seams and sealed by means of waterproof sealant tape.

It is well-known that this production method is very complicated and delicate.

Moreover, precise shaping of the sock closed by means of seams and not by lasting on a last is difficult to achieve, both due to difficulty in preparing the several components that must be cut and sewn with accurate precision and due to difficulty in achieving correct tension, without creases, between the upper and the lining.

Indeed, due to the fact that during the sewing of the lining the last is not used, said lining tends to wrinkle during the lasting of the upper, contrary to what occurs instead when one uses "AGO lasting" construction, which allows to obtain an upper and a lining that are correctly formed, stretched and smooth.

DISCLOSURE OF THE INVENTION

The aim of the present invention is to provide a method for manufacturing a waterproof and vapor-permeable shoe that allows to achieve effective sealing of the lasting margins to the assembly insole in a simpler and more effective manner than in currently known methods for manufacturing shoes that are vapor-permeable through a perforated sole.

Within this aim, an object of the invention is to propose a method that allows to provide upper assemblies, and soles associated therewith, that are structurally simpler and easier to provide with respect to those of currently known shoes that are vapor-permeable through the perforated sole.

Another object of the invention is to provide a method that allows to provide waterproof and vapor-permeable upper assemblies already during lasting, which therefore do not require the provision of a sole with a waterproof and vapor-permeable membrane that seals in a waterproof and vapor-permeable manner the regions thereof that are perforated or open for vapor permeation.

Another object of the invention is to propose a method for providing waterproof and vapor-permeable shoes that is simple to perform with relatively low costs.

This aim, as well as these and other objects that will become better apparent hereinafter, are achieved by a method for providing a waterproof and vapor-permeable shoe, which consists in constructing an upper shoe assembly, which is composed of at least one vapor-permeable lining, a vapor-permeable upper, and a waterproof and vapor-permeable upper membrane that is between them, fixing to a vapor-permeable assembly insole a first gasket made of waterproof material, which has at least one vapor-permeable or perforated portion, lasting, comprising the association of lasting margins of said upper shoe assembly with said first gasket, at least predominantly according to the construction known as "AGO lasting", to obtain an upper assembly of said shoe, sealing said lasting margins to said first gasket by means of a second gasket, comprising the adhesion of said second gasket so as to straddle said lasting margins and said first gasket, assembling, comprising the connection of a sole to said upper assembly at least by means of the adhesion, so as to provide a waterproof seal, of material that composes said sole to said second gasket.

BRIEF DESCRIPTION OF THE DRAWINGS

Further characteristics and advantages of the invention will become better apparent from the description of preferred but not exclusive embodiments of the method for providing a waterproof and vapor-permeable shoe according to the invention, illustrated by way of non-limiting example in the accompanying drawings, wherein.

It is noted that anything found to be already known during the patenting process is understood not to be claimed and to be the subject of a disclaimer.

WAYS OF CARRYING OUT THE INVENTION

With reference to the figures, the reference numeral 100 generally designates a method for manufacturing a waterproof and vapor-permeable shoe 10 that has a particularity in that it consists in constructing an upper shoe assembly, which is composed of a vapor-permeable lining 12, a vapor-permeable upper 13, and a waterproof and vapor-permeable upper membrane 14 that is between them, fixing 101, to a vapor-permeable assembly insole 15, a first gasket 16 made of waterproof material, which has at least one vapor-permeable or perforated portion 17, lasting 102, comprising the association of lasting margins 18 of the upper shoe assembly with the first gasket 16, at least predominantly according to the construction known as "AGO lasting", to obtain an upper assembly 11 of the shoe 10, sealing 103 the lasting margins 18 to the first gasket 16 by means of a second gasket 19, comprising the adhesion of the second gasket 19 so as to straddle the lasting margins 18 and the first gasket 16, assembling 104, comprising the connection of a sole 20 to the upper assembly 11 at least by means of the adhesion, so as to provide a waterproof seal, of material that composes the sole 20 to the second gasket 19.

Advantageously, said step for constructing an upper shoe assembly, which is per se known and not shown in the accompanying figures, comprises:

in a first embodiment, the association of the upper membrane 14 with the upper 13, so as to not compromise their vapor permeability, for example by spot gluing, or as an alternative in a second embodiment, the association of the upper membrane 14 with the lining 12, so as to not compromise its vapor permeability, for example by spot gluing or lamination.

The upper membrane 14 is of the type of commonly commercially available vapor-permeable and waterproof membranes, made for example of expanded polytetrafluoroethylene, also known as e-PTFE, polyurethane, also known as PU, or the like, and a mesh that reinforces it is conveniently associated therewith.

In order to further strengthen the lower rim 14a of the upper membrane 14, it can be advantageous to apply, directly on the lower rim 14a, a waterproof reinforcement element, not shown in the figures, for example a thermoadhesive tape, which is preferably elastic and is made of synthetic material, such as for example polyurethane. A tape that is particularly suitable for providing said waterproof reinforcement element is proposed commercially by the company TecnoGI with a weight of 120-250 g/m².

In a first constructive solution, the fixing step 101 conveniently comprises an operation for connecting, by gluing, heating and pressing, the first gasket 16 to the assembly insole 15.

The first gasket 16 is made of waterproof polymeric material, advantageously polyurethane (PU) or polyethylene (PE) or polyvinyl chloride (PVC) or thermoplastic film.

Said first embodiment advantageously entails that the sole 20, to be assembled subsequently on the upper assembly 11, has at least one vapor permeation region 21, which is perforated or affected by broad openings and is sealed in a waterproof and vapor-permeable manner by means of a waterproof and vapor-permeable insert that is sealed perimetrically thereto.

The vapor-permeable or perforated portion 17 is conveniently arranged, when the sole 20 is sealed to the upper assembly 11, above said vapor permeation region 21.

Figure 2:
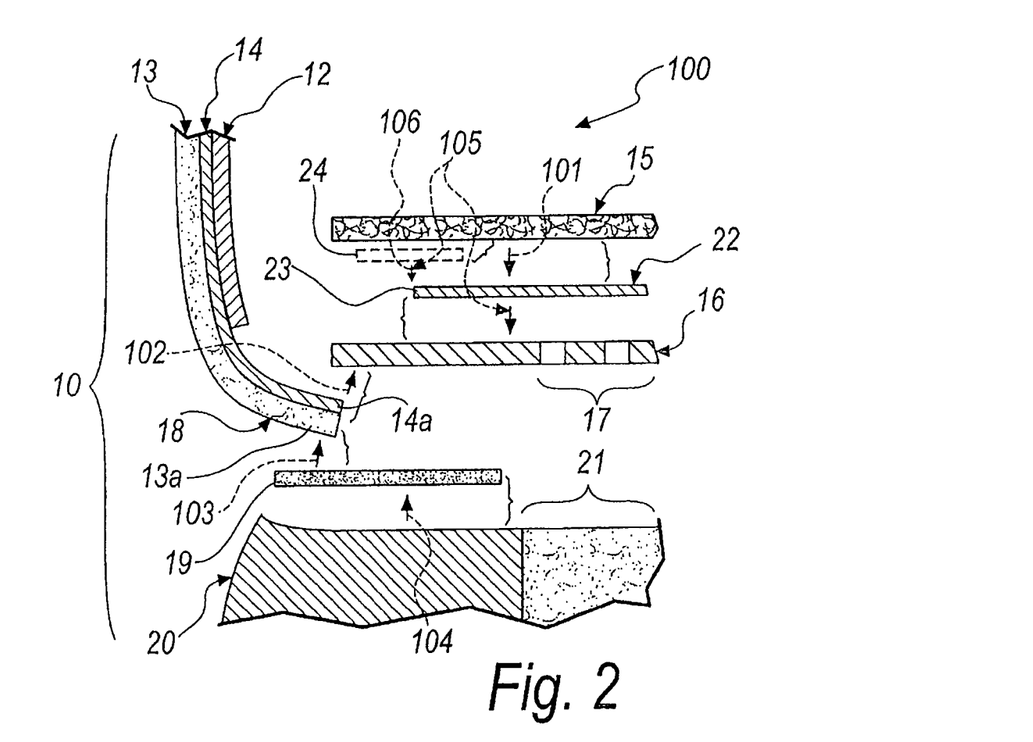
Figure 2A:
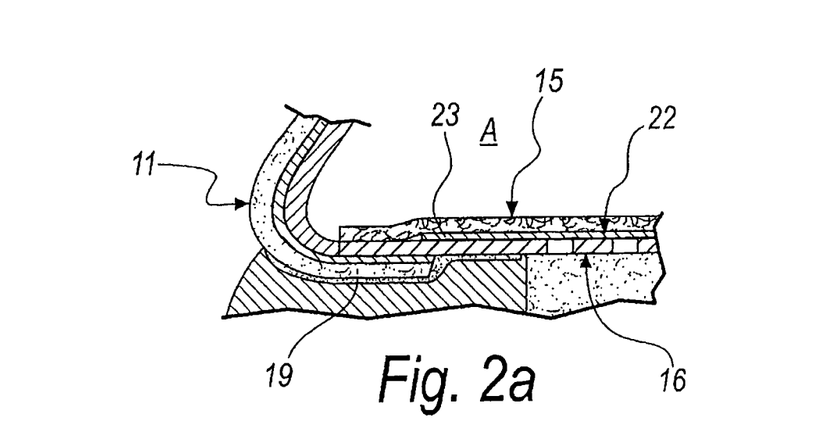
FIGS. 2a and 2b are simplified diagrams of alternative embodiments of an upper assembly of a waterproof and vapor-permeable shoe obtained according to the method for providing a waterproof and vapor-permeable shoe according to the invention, exemplified in FIG. 2.
Figure 2B:
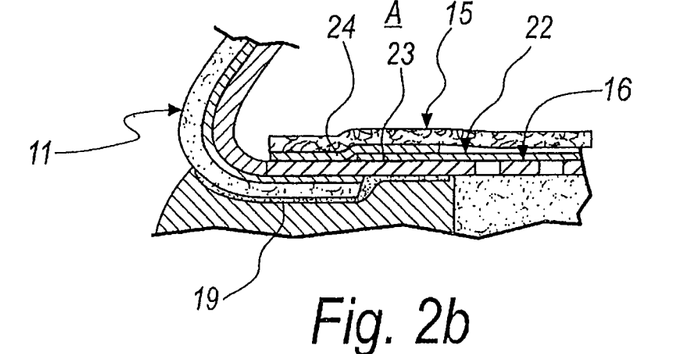
Figure 3:
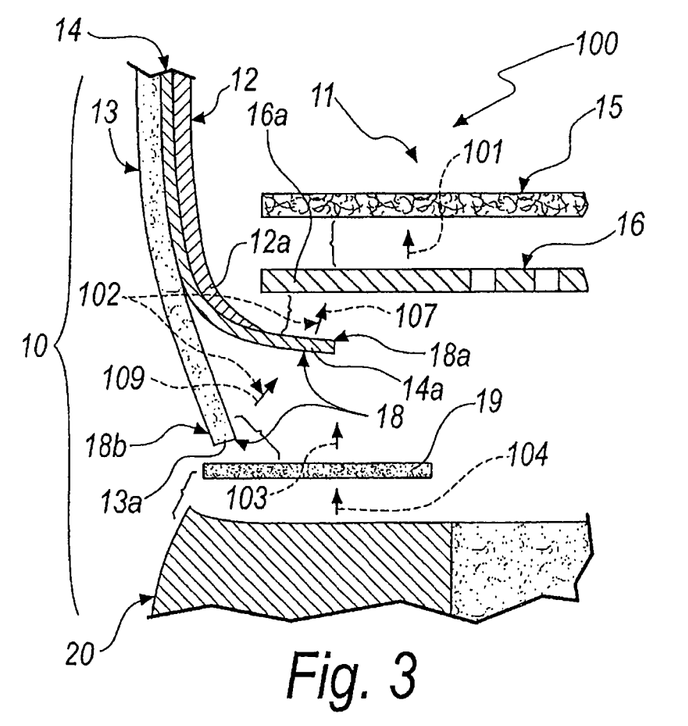
Figure 3A:
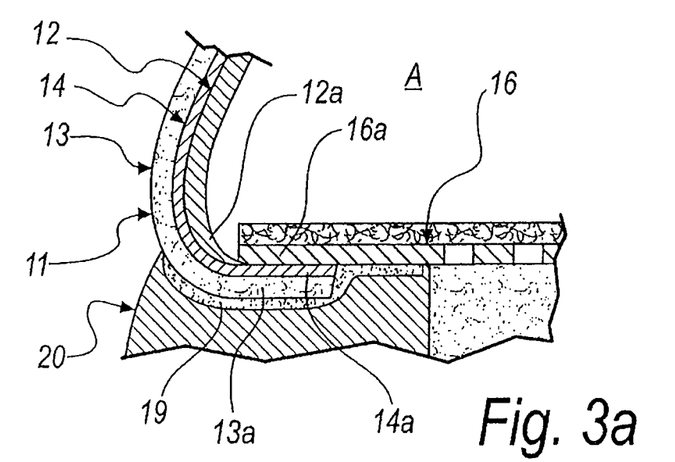
FIG. 3a is a simplified diagram of an embodiment of an upper assembly of a waterproof and vapor-permeable shoe obtained according to the method for providing a waterproof and vapor-permeable shoe according to the invention, exemplified in FIG. 3.
Figure 3B:
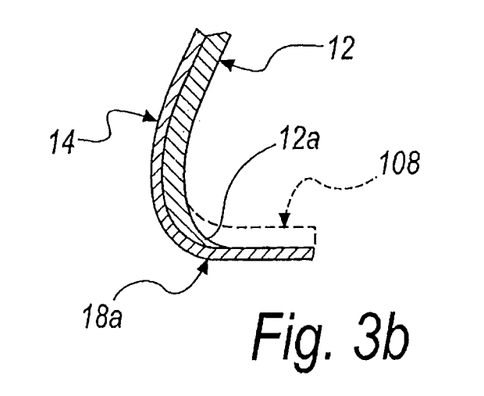
FIG. 3b is a simplified diagram of a detail of an upper assembly of a waterproof and vapor-permeable shoe obtained according to the method for providing a waterproof and vapor-permeable shoe according to the invention, exemplified in FIG. 3.

With reference to FIGS. 2, 2a and 2b, in a second constructive solution of the fixing step 101, which is alternative to said first constructive solution, it comprises an operation 105 for gluing a waterproof and vapor-permeable plantar insert 22 to the first gasket 16, made of waterproof polymeric material, the plantar insert 22 being between the assembly insole 15 and the first gasket 16 so as to cover, sealing it in a waterproof and vapor-permeable manner, at least the vapor-permeable or perforated portion 17 thereof.

Advantageously, the plantar insert 22 comprises at least one membrane made of expanded polytetrafluoroethylene, also known as e-PTFE, or polyurethane, also known as PU, or similar materials, and is optionally associated, on its faces, with one or two meshes.

It should be noted that in an alternative and substantially equivalent manner, said second constructive solution can be provided by first gluing the plantar insert 22 to the first gasket 16, sealing it as mentioned, and then gluing the assembly insole 15 to the plantar insert 22, or by first gluing the plantar insert 22 to the assembly insole 15 and then gluing it also to the first gasket, sealing it as mentioned.

Said gluing operation 105 conveniently provides for the gluing, so as to form a waterproof seal, at least of the perimeter 23 of the plantar insert 22 to a region that surrounds the vapor-permeable or perforated portion 17.

Conveniently, if the first gasket is provided with a plurality of vapor-permeable or perforated portions, there is a corresponding number of plantar inserts that cover them, being sealed perimetrically thereto to allow vapor permeation and prevent the infiltration of water in the liquid state through them.

Moreover, said gluing operation 105 advantageously provides for the application 106 of a film 24 of thermoplastic polymeric material that seals the plantar insert 22 around the vapor-permeable or perforated portion 17 of the first gasket 16, surmounting the perimeter 23 of the plantar insert 22.

Figure 1:
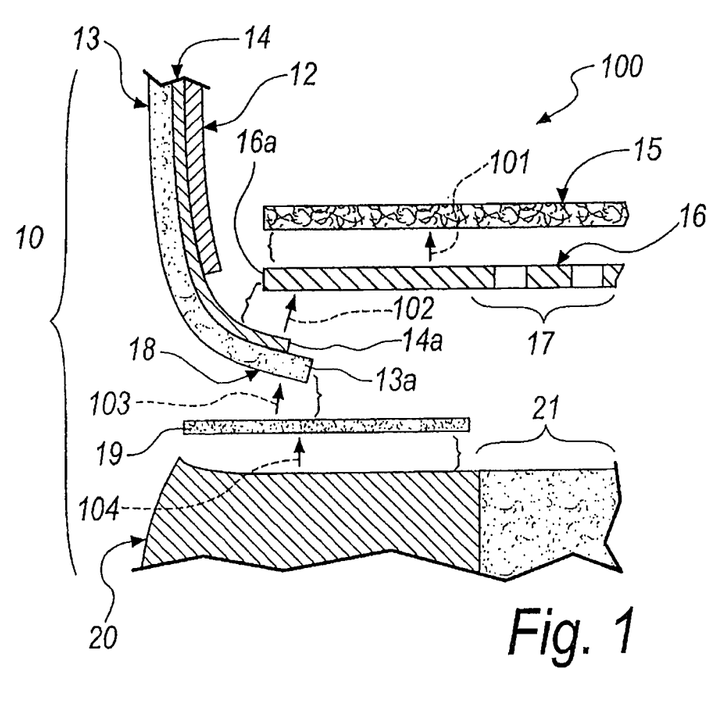
FIGS. 1, 2, 3, 4, 5 and 6 are simplified diagrams of alternative preferred embodiments of the method for providing a waterproof and vapor-permeable shoe according to the invention.
Figure 1A:
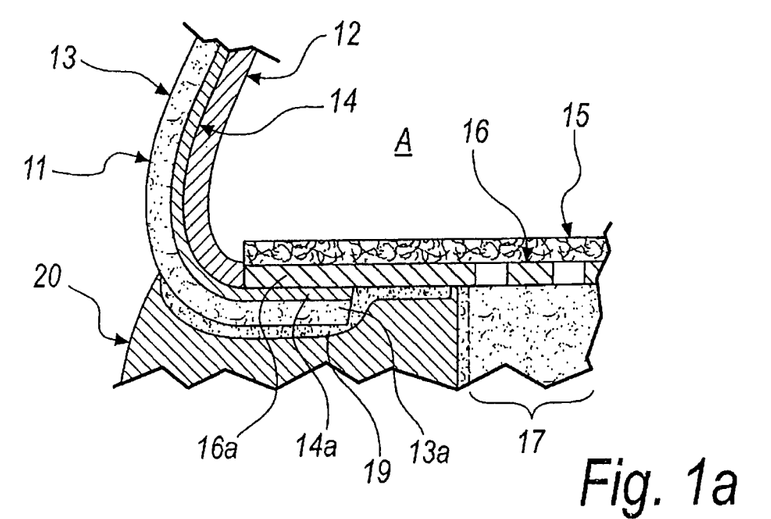
FIGS. 1a, 1b and 1c are simplified diagrams of alternative embodiments of an upper assembly of a waterproof and vapor-permeable shoe obtained according to the method for manufacturing a waterproof and vapor-permeable shoe according to the invention, exemplified in FIG. 1.
Figure 1B:
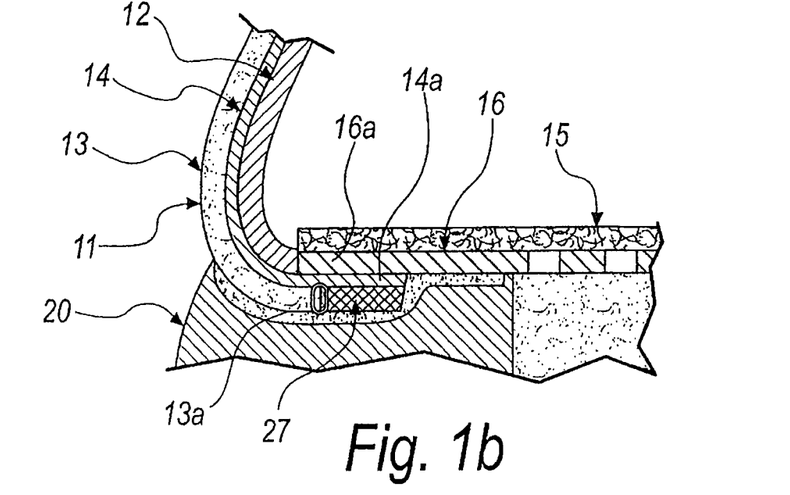
Figure 1C:
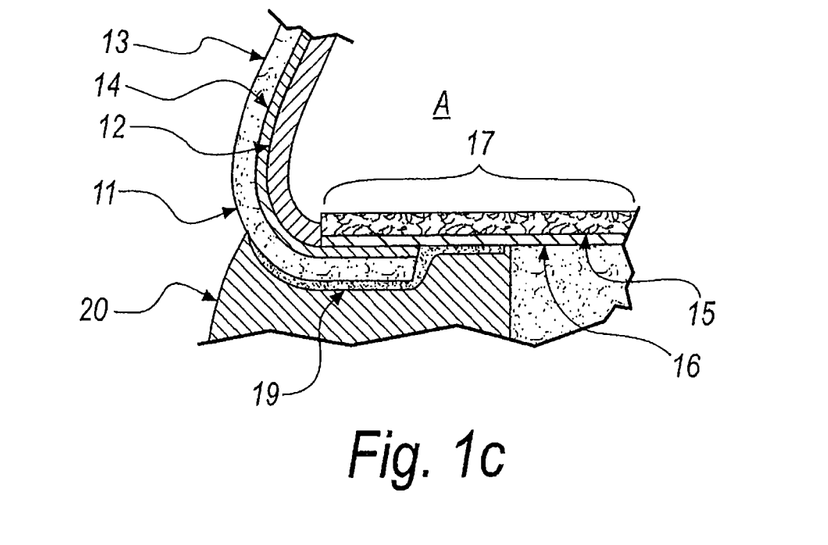

With reference to FIG. 1c, in a third embodiment, which is alternative to the previously described constructive solutions, the vapor-permeable or perforated portion 17 of the first gasket 16 is provided by means of a waterproof and vapor-permeable membrane, made of a material advantageously selected among expanded polytetrafluoroethylene, polyurethane and the like.

In particular, conveniently the vapor-permeable or perforated portion 17 affects the entire first gasket 16, which therefore is substantially entirely made of waterproof and vapor-permeable material, reinforcement layers being optionally provided which adhere thereto in order to give it greater structural strength.

Preferably, in said second and third embodiments, a sole 20 is associated with the upper assembly 11 in the subsequent assembling step 104, said sole having the vapor permeation region 21 affected by diffuse holes or broad openings which are clear.

It should be noted that these second and third embodiments therefore allow to use a sole with a structure that is simpler than the one to be used in the first constructive solution, which in order to be vapor-permeable and waterproof is equipped with a waterproof and vapor-permeable insert, as mentioned.

In a first mode of execution of the lasting step 102, it conveniently comprises folding and gluing so as to form a waterproof seal, according to the construction known as "AGO lasting", below the perimetric edge 16*a* of the first gasket 16, the lasting margins 18 composed of the lower rim 14*a* of the upper membrane 14 and of the lower edge 13*a* of the upper 13, which are joined quite coincident.

In a second mode of execution of the lasting step 102, it comprises advantageously a lining lasting 107, which consists in folding and gluing, preferably so as to form a waterproof seal, according to the construction known as "AGO lasting", below the perimetric edge 16*a* of the first gasket 16, first lasting margins 18*a* of the lasting margins 18, composed of the lower flap 12*a* of the lining 12 and of the lower rim 14*a* of the upper membrane 14, which are joined quite coincident.

The lining lasting 107 is preceded conveniently by a skiving 108 of the lower flap 12*a*, so as to expose the lower rim 14*a*, to which it is joined, the lower rim 14*a* being exposed through the lower flap 12*a* for its gluing so as to form a seal to the first gasket 16 during lining lasting 107.

Furthermore, conveniently, the lasting step 102 comprises an upper lasting 109 which follows the lining lasting 107, which consists in folding and gluing, according to the construction known as "AGO lasting", second lasting margins 18*b* of the lasting margins 18, which are composed of the lower edge 13*a* of the upper 13, below the perimetric edge 16*a* of the first gasket 16, covering at least partly the lower rim 14*a* which, joined to the lower flap 12*a*, covers the perimetric edge 16*a*.

In an alternative variation, not shown in the accompanying figures, advantageously the lining lasting consists in sewing, according to the construction known as "Strobel", first lasting margins 18*a* of the lasting is margins 18, composed of the lower flap 12*a* of the lining 12 and of the lower rim 14*a* of the upper membrane 14, which are joined quite coincident, to the perimetric region 15*a* and to the perimetric edge 16*a*, respectively of the assembly insole 15 and of the first gasket 16.

As an alternative, the lasting step 102 comprises the simultaneous assembly of the first lasting margins 18*a* and of the second lasting margins 18*b* of the lasting margins 18.

Figure 4:
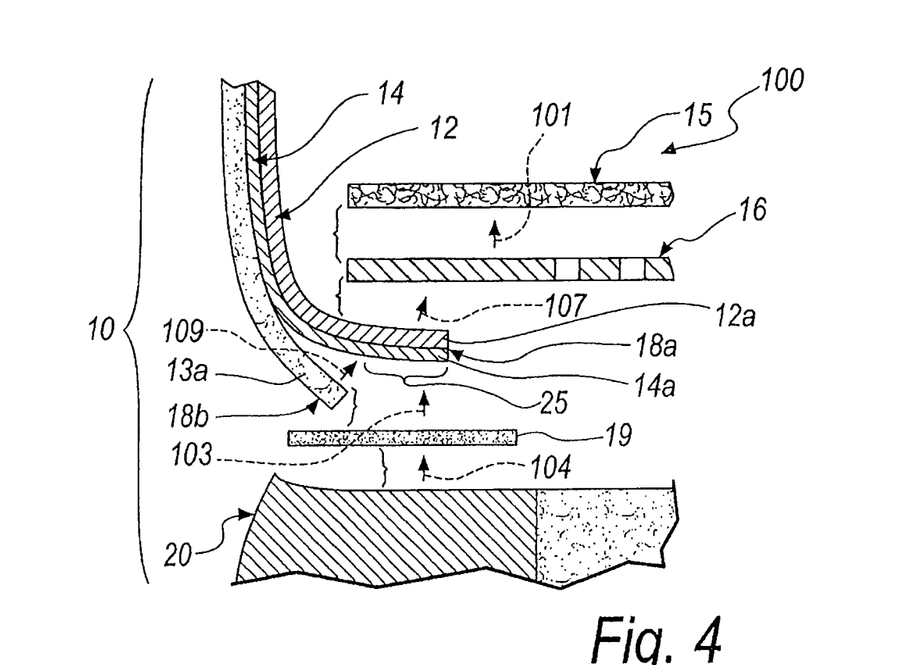
Figure 4A:
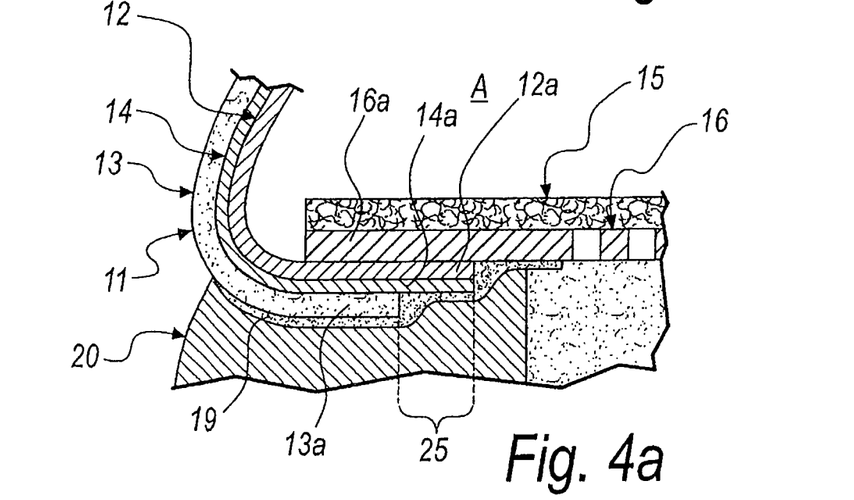
FIG. 4a is a simplified diagram of an embodiment of an upper assembly of a waterproof and vapor-permeable shoe obtained according to the method for providing a waterproof and vapor-permeable shoe according to the invention, exemplified in FIG. 4.

With reference to FIGS. 4 and 4*a*, preferably the upper lasting 109 entails that the lower edge 13*a* is folded and glued onto the lower rim 14*a*, leaving an end portion 25 thereof exposed.

In this case, the lining lasting 107 does not necessarily entail, in the gluing of the first lasting margins 18*a*, the sealing of the upper membrane 14 to the first gasket 16 by gluing, which instead occurs in the subsequent sealing step 103, by means of the second gasket 19.

Figure 5:
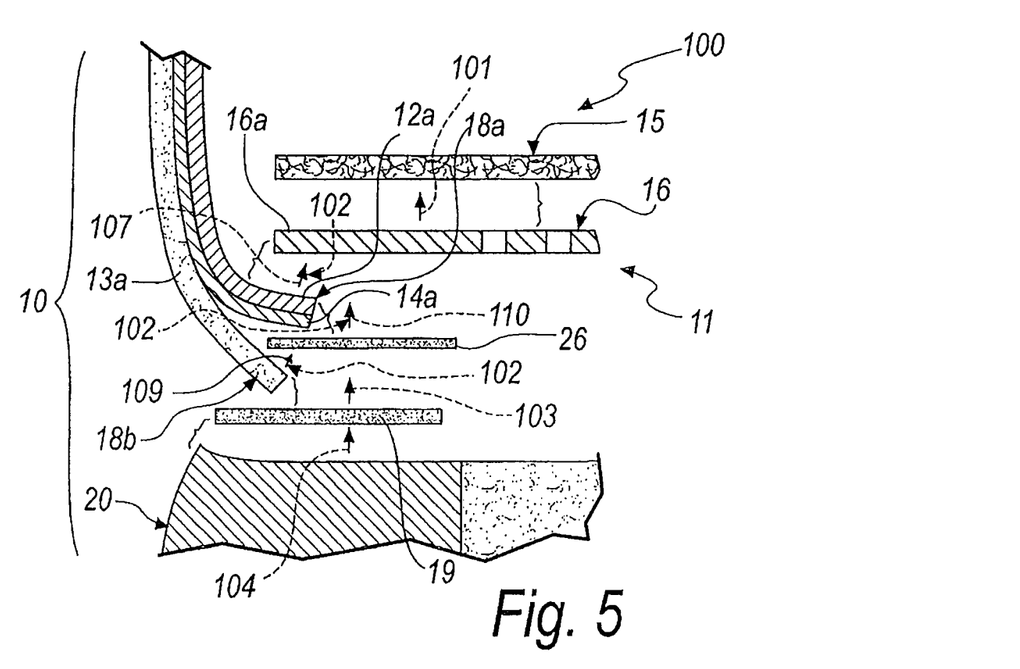
Figure 5A:
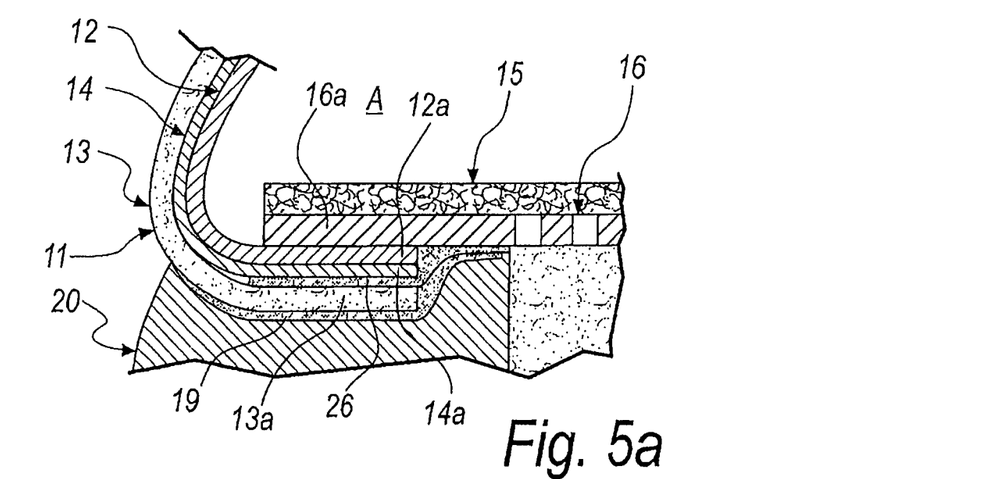
FIG. 5a is a simplified diagram of an embodiment of an upper assembly of a waterproof and vapor-permeable shoe obtained according to the method for providing a waterproof and vapor-permeable shoe according to the invention, exemplified in FIG. 5.

As an alternative, with reference to FIGS. 5 and 5*a*, the lasting 102 comprises:
- a pre-sealing operation, which consists in sealing the lower rim 14*a* to the first gasket 16, which provides for the application 110, so as to straddle them, of an auxiliary gasket 26 made of thermoplastic polymeric sealing material,
- an upper lasting 109, which consists in folding and gluing, according to the construction known as "AGO lasting", second lasting margins 18*b* of the lasting margins 18, which are composed of the lower edge 13*a* of the upper 13, below the perimetric edge 16*a* of the first gasket 16, covering at least partly the auxiliary gasket 26 that surmounts the lower rim 14*a*.

In this case also, the lasting step 102 does not necessarily provide for the sealing of the upper membrane 14 to the first gasket 16 by gluing, which instead occurs in the subsequent pre-sealing step, by means of the auxiliary gasket 26.

Figure 6:
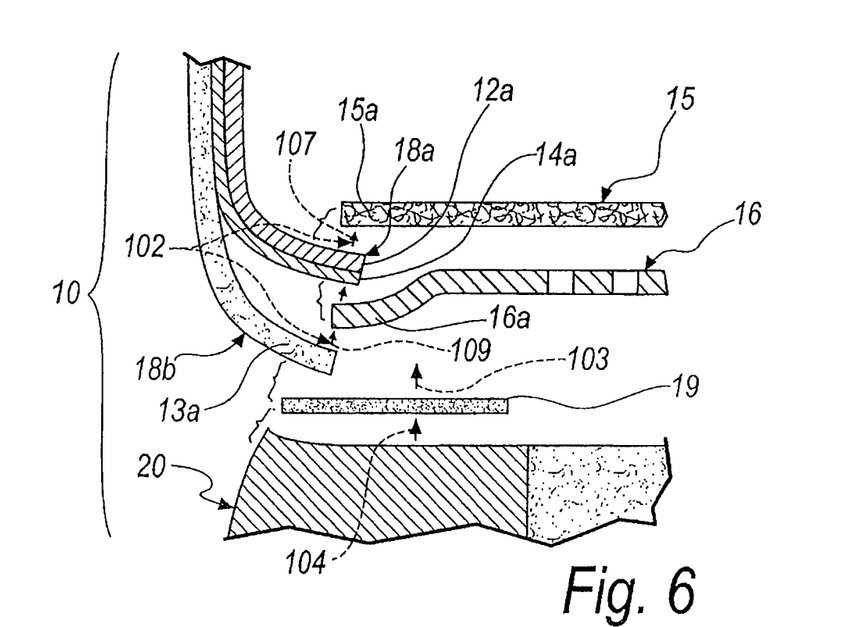
Figure 6A:
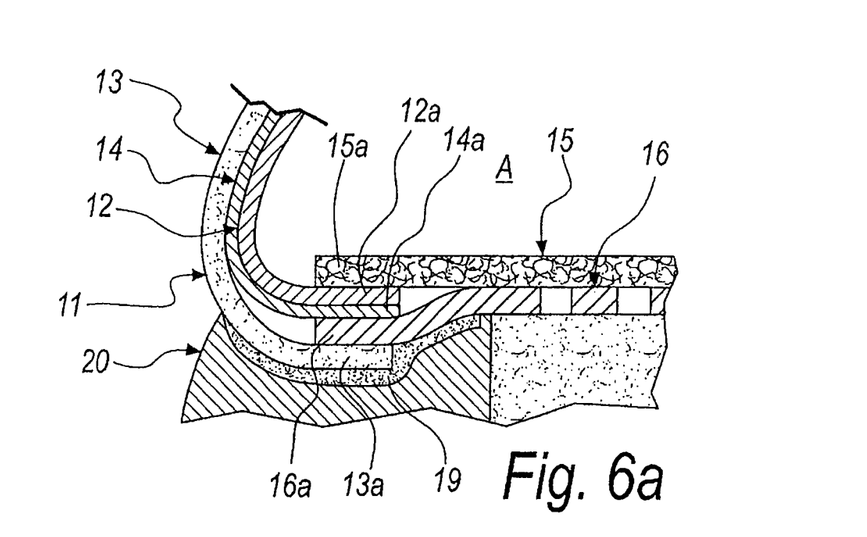
FIG. 6a is a simplified diagram of an embodiment of an upper assembly of a waterproof and vapor-permeable shoe obtained according to the method for providing a waterproof and vapor-permeable shoe according to the invention, exemplified in FIG. 6.

With reference to FIGS. 6 and 6*a*, in a third mode of execution of the lasting step 102, it comprises conveniently a lining lasting 107 that consists in folding and gluing, according to the construction known as "AGO lasting", below the perimetric region 15*a* of the assembly insole 15, first lasting margins 18*a* of the lasting margins 18 composed of the lower flap 12*a* of the lining 12 and of the lower rim 14*a* of the upper membrane 14, which are joined quite coincident.

In an alternative variation, not shown in the accompanying figures, advantageously the lining lasting consists in sewing, according to the construction known as "Strobel", first lasting margins 18*a* of the lasting margins 18, composed of the lower flap 12*a* of the lining 12 and of the lower rim 14*a* of the upper membrane 14, which are joined quite coincident, to the perimetric region 15*a* of the assembly insole 15.

Advantageously, in said third mode of execution the lasting step 102 comprises a lining lasting 109 that consists in folding and gluing, according to the construction known as "AGO lasting", second lasting margins 18*b* of the lasting margins 18, composed of the lower edge 13*a* of the upper 13, below the perimetric edge 16*a* of the first gasket 16, the perimetric edge 16*a* surmounting the lower rim 14*a* and adhering thereto so as to form a waterproof seal.

In a first embodiment of the sealing step 103, the second gasket 19 preferably is a waterproof film of thermoplastic hot-melt adhesive, made of a material selected among polyurethane, polyester, polyamide or polyolefins.

The sealing step 103 advantageously comprises the adhesion, so as to form a waterproof seal, of said waterproof film so as to straddle the lasting margins 18 and on the first gasket 16 so as to seal against water thereto the lower rim 14*a* of the upper membrane 14.

With reference to FIG. 1*b*, in said first embodiment, conveniently said step of construction of an upper shoe assembly comprises:
- the connection of a sealing element 27 to the lower edge 13*a*, so as to extend from it, to which it is joined conveniently by means of a zigzag seam, for approximately 8-12 mm,
- the subsequent joining of the upper membrane 14 to the upper 13 and to the sealing element 27 quite coincident, said membrane covering impermeably the region for connection of the sealing element 27 to the lower edge 13*a*.

Preferably, the sealing element 27 is thinner than the upper 13 and is made of a material that is lighter than the upper 13, so as to limit the formation of creases created as a consequence of the operation for assembling the toe and heel of the upper 13 on the first gasket 16.

In a first constructive variation of the sealing element 27, said element is made of waterproof and heat-activatable polymeric material, the sealing step 103 advantageously providing for its melting for adhesion, so as to form a waterproof seal, to the lower rim 14*a* of the upper membrane 14.

In a second and alternative constructive variation of the sealing element 27, said sealing element is made of a material that is permeable to sealing material, the sealing step 103 conveniently comprising the permeation through it of the material that constitutes the second gasket 19, which grips, so as to provide a waterproof seal, the lower rim 14*a*.

Another function of the sealing element 27 is to strengthen the lower rim 14*a* of the upper membrane 14 while allowing its sealing to the second gasket 19.

As an alternative, if the lasting step is performed manually by using o appropriate pincers, then advantageously it would be possible to eliminate said sealing element 27, without the danger of damaging the lower rim 14*a* of the upper membrane 14 during lasting.

In this manner, the second gasket 19 is sealed directly to the upper membrane 14.

In a second embodiment of the sealing step 103, the second gasket 19 is provided by means of a waterproof film of thermoplastic hot-melt adhesive made of a material selected among polyurethane, polyester, polyamide or polyolefins.

The sealing step 103, in said second embodiment, conveniently follows the lasting step 102 according to the second mode of execution, and comprises the adhesion, so as to form a waterproof seal, of the waterproof film so as to straddle the lasting margins 18 and the first gasket 16 so as to seal against water thereto the lower edge 13*a* and the lower rim 14*a*, adhering thereto at the end portion 25, as shown by way of non-limiting example in FIGS. 4 and 4*a*.

In a third embodiment of the sealing step 103, the second gasket 19 preferably comprises a waterproof film of thermoplastic hot-melt adhesive, made of a material selected among polyurethane, polyester, polyamide or polyolefins.

The sealing step 103, which conveniently follows the lasting step 102 according to the second mode of execution, comprises the adhesion, so as to form a waterproof seal, of the waterproof film so as to straddle the lower edge 13*a* and the auxiliary gasket 26, as shown by way of non-limiting example in FIGS. 5 and 5*b*.

In a fourth embodiment of the sealing step 103 also, the second gasket 19 comprises a waterproof film of thermoplastic hot-melt adhesive, made of a material selected among polyurethane, polyester, polyamide or polyolefins.

The sealing step 103, which conveniently follows the lasting step 102 according to the third mode of execution, comprises the adhesion, so as to form a waterproof seal, of said waterproof film so as to straddle the lower edge 13*a* of the upper 13 and the perimetric edge 16*a* of the first gasket 16, as shown by way of non-limiting example in FIGS. 6 and 6*a*.

The assembling step 104 alternately advantageously comprises
either the gluing of the sole 20 to the upper assembly 11 by means of the adhesion, so as to form a waterproof seal, to the second gasket 19,
or the overmolding of at least one component of the sole 20, for example of a midsole, onto the upper assembly 11, which provides for the fusion of the component with the second gasket 19, so as to provide a waterproof seal of the sole 20 with respect to the upper assembly 11.

In practice it has been found that the invention achieves the intended aim and objects, providing a method for providing a waterproof and vapor-permeable shoe that allows to achieve effective sealing of the lasting margins to the assembly insole in a simpler and more effective manner than in currently known methods for providing shoes that are vapor-permeable through a perforated sole.

The second gasket in fact seals effectively the lasting margins to the first gasket, comprising them impermeably between said gaskets and simultaneously forming a region for sealing to the sole.

Thus, in fact, by sealing the second gasket to the first gasket, optionally also by means of the auxiliary gasket, any water that might permeate the upper is prevented from passing toward the region below the insole and vice versa any water that might rise through the free openings or holes of the sole would be prevented from passing toward the upper.

Moreover, a method for providing a waterproof and vapor-permeable shoe according to the invention allows to produce upper assemblies and soles, with which they are associated, which are structurally simpler and easier to provide, with respect to the ones of currently known shoes that are vapor-permeable through the perforated sole.

In particular, by means of a method for providing a waterproof and vapor-permeable shoe according to the invention, it is possible to provide waterproof and vapor-permeable upper assemblies already during lasting, which therefore do not require the provision of a sole with a waterproof and vapor-permeable membrane that seals in a waterproof and vapor-permeable manner the regions thereof that are perforated or open for vapor permeation.

The invention thus conceived is susceptible of numerous modifications and variations, all of which are within the scope of the appended claims; all the details may further be replaced with other technically equivalent elements.

In practice, the materials used, so long as they are compatible with the specific use, as well as the contingent shapes and dimensions, may be any according to requirements and to the state of the art.

The disclosures in European Patent Application No. 09425138.6 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A method for providing a waterproof and vapor-permeable shoe, comprising:
   constructing an upper shoe assembly, which includes at least one vapor-permeable lining, a vapor-permeable upper, and waterproof and vapor-permeable upper membrane that is between them;
   fixing a vapor-permeable assembly insole to a first gasket made of waterproof material, which includes at least one vapor-permeable or perforated portion;
   lasting, comprising association of lasting margins of the upper shoe assembly with the first gasket, at least predominantly by AGO lasting, to obtain an upper assembly of the shoe;
   sealing the lasting margins of the upper to the first gasket by a second gasket, comprising adhesion of the second gasket to the first gasket so that the second gasket is in direct contact with each of the lasting margins of the upper and the first gasket; and
   assembling, comprising connection of a sole to the upper assembly at least by the adhesion, so as to provide a waterproof seal, of material that composes the sole to the second gasket,
   wherein the lasting comprises folding and gluing, so as to provide a waterproof seal, according to AGO lasting, below a perimetric edge of the first gasket, the lasting margins composed of a lower rim of the upper membrane and of a lower edge of the upper, so as to provide a waterproof seal of the upper membrane to the first gasket.

2. The method according to claim 1, wherein in at least one of the fixing, lasting, and sealing, the waterproof sealing of the upper assembly is provided.

3. The method according to claim 1, wherein the constructing an upper shoe assembly comprises association of the upper membrane with the upper so as to not compromise their vapor permeability, or by spot gluing.

4. The method according to claim 1, wherein the constructing an upper shoe assembly comprises association of the upper membrane with the lining, so as to not compromise their vapor permeability, or by spot gluing, or by lamination.

5. The according to claim 1, wherein the fixing comprises an operation for connecting, by gluing, heating, and pressing, the first gasket, made of waterproof polymeric material, to the assembly insole.

6. The method according to claim 1, wherein the fixing comprises an operation for gluing at least one waterproof and vapor-permeable plantar insert to the first gasket, made of waterproof polymeric material, the at least one plantar insert being between the assembly insole and the first gasket so as to cover, sealing it in a waterproof and vapor-permeable manner, the at least one vapor-permeable or perforated portion thereof.

7. The method according to claim 6, wherein the gluing operation provides for gluing, so as to form a waterproof seal, of at least the perimeter of the at least one plantar insert at least to a region that surrounds the at least one vapor-permeable or perforated portion.

8. The method according to claim 6, wherein the gluing operation provides for application of a film of thermoplastic polymeric material that provides a perimetric sealing of the at least one plantar insert, surmounting its perimeter, to the first gasket, around the at least one vapor-permeable or perforated portion.

9. The method according to claim 1, wherein the at least one vapor-permeable or perforated portion of the first gasket is made of waterproof and vapor-permeable material.

10. The method according to claim 9, wherein the waterproof and vapor-permeable material is selected among expanded polytetrafluoroethylene or polyurethane.

11. The method according to claim 1, wherein the lasting comprises a lining lasting that consists in folding and gluing, at least predominantly by AGO lasting, below the perimetric edge of the first gasket, first lasting margins of the lasting margins composed of the lower flap of the lining and of the lower rim of the upper membrane.

12. The method according to claim 11, wherein the lining lasting consists in folding and gluing, so as to provide a waterproof seal, at least predominantly by AGO lasting, below the perimetric edge of the first gasket, first lasting margins of the lasting margins composed of the lower flap of the lining and of the lower rim of the upper membrane, to provide the waterproof seal of the upper membrane to the first gasket.

13. The method according to claim 1, wherein the lasting comprises a lining lasting that consists in sewing, according to a construction of Strobel, first lasting margins of the lasting margins, which are composed of the lower flap of the lining and of the lower rim of the upper membrane, which are joined quite coincident, to the perimetric region and to the perimetric edge, respectively of the assembly insole and of the first gasket.

14. The method according to claim 11, wherein the lining lasting is preceded by a skiving of the lower flap, so as to expose the lower rim to which it is joined, the lower rim being exposed through the lower flap for its gluing so as to provide a seal to the first gasket during the lining lasting.

15. The method according to claim 11, wherein the lasting comprising an upper lasting, which consists in folding and gluing, according to AGO lasting, second lasting margins of the lasting margins, which are composed of the lower edge of the upper, below the perimetric edge of the first gasket, covering at least partly the lower rim, which, joined to the lower flap, covers the perimetric edge.

16. The method according to claim 15, wherein in the upper lasting the lower edge of the upper, which is folded and glued onto the lower rim, leaves an end portion thereof exposed.

17. The method according to claim 1, wherein the lasting comprises a lining lasting, which consists in folding and gluing, according to AGO lasting, below the perimetric region of the assembly insole, first lasting margins of the lasting margins composed of the lower flap of the lining and of the lower rim of the upper membrane.

18. The method according to claim 1, wherein the lasting comprises a lining lasting, which consists in sewing, according to a construction of Strobel, to the perimetric region of the assembly insole, first lasting margins of the lasting margins composed of the lower flap of the lining and of the lower rim of the upper membrane.

19. The method according to claim 17, wherein the lasting comprises an upper lasting, which follows the lining lasting, and consists in folding and gluing, according to AGO lasting, second lasting margins of the lasting margins, composed of the lower edge of the upper, below the perimetric edge of the first gasket, the perimetric edge surmounting the lower rim.

20. The method according to claim 1, wherein the second gasket comprises a waterproof film of thermoplastic hot-melt adhesive, the sealing comprising the adhesion, so as to form a waterproof seal, of the waterproof film so as to be in direct contact with the lasting margins and the first gasket.

21. The method according to claim 20, wherein the construction of an upper shoe assembly comprises:
 connection of a sealing element to the lower edge, so as to extend from it; and
 subsequent joining of the upper membrane to the upper and to the sealing element, which covers in a waterproof manner the region for connection of the sealing element to the lower edge.

22. The method according to claim 21, wherein the sealing element is made of waterproof and heat-activatable polymeric material, the sealing comprising melting of the sealing element for its adhesion, so as to form a waterproof seal, to the lower rim of the upper membrane.

23. The method according to claim 21, wherein the sealing element is made of a material that is permeable to sealing material, the sealing comprising permeation through the sealing element of the material that constitutes the second gasket, which grips, so as to form a waterproof seal, the lower rim.

24. The method according to claim 16, wherein the second gasket comprises a waterproof film of thermoplastic hot-melt adhesive, the sealing comprising adhesion, so as to form a waterproof seal, of the waterproof film so as to be in direct contact with the lasting margins and the first gasket, so as to seal against water thereto the lower rim, adhering to it at the end portion.

25. The method according to claim 19, wherein the second gasket comprises a waterproof film of thermoplastic hot-melt adhesive, the sealing comprising adhesion, so as to form a waterproof seal, of the waterproof film so as to be in direct contact with the lower edge and the perimetric edge of the first gasket.

26. The method according to claim 1, wherein the assembling comprises gluing of the sole to the upper assembly by adhesion, so as to form a waterproof seal, to the second gasket.

27. The method according to claim 1, wherein the assembling comprises overmolding of at least one component of the sole on the upper assembly, so as to provide a waterproof seal of the sole to the second gasket.

28. The method according to claim 6, wherein the plantar insert comprises at least one membrane made of expanded polytetrafluoroethylene or polyurethane, and wherein the plantar insert includes on its faces one or two meshes.

\* \* \* \* \*